United States Patent
Mojdehi et al.

(10) Patent No.: US 11,842,478 B2
(45) Date of Patent: Dec. 12, 2023

(54) METHOD AND APPARATUS FOR AUTOMATED ADHESIVE WASH-OFF QUALITY CONTROL AND ROOT-CAUSE ANALYSIS USING ARTIFICIAL INTELLIGENCE

(71) Applicant: Ford Global Technologies, LLC, Dearborn, MI (US)

(72) Inventors: Ahmad Mojdehi, Ann Arbor, MI (US); David John Hill, Ann Arbor, MI (US); Christopher Weller, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 17/061,463

(22) Filed: Oct. 1, 2020

(65) Prior Publication Data
US 2022/0108432 A1    Apr. 7, 2022

(51) Int. Cl.
*G06T 7/00*    (2017.01)

(52) U.S. Cl.
CPC .... *G06T 7/001* (2013.01); *G06T 2207/20072* (2013.01); *G06T 2207/30156* (2013.01)

(58) Field of Classification Search
CPC .......... G06T 7/001; G06T 2207/20072; G06T 2207/30156
See application file for complete search history.

(56) References Cited

U.S. PATENT DOCUMENTS

| | | | | |
|---|---|---|---|---|
| 6,687,402 B1* | 2/2004 | Taycher | ................... | G06T 7/001 382/199 |
| 8,073,239 B1* | 12/2011 | Bahrami | .................. | G06T 7/001 382/141 |
| 2004/0081347 A1* | 4/2004 | Bernatek | ............ | G01N 21/8806 382/141 |
| 2010/0193974 A1* | 8/2010 | Wang | ................... | H01L 21/6715 257/E23.179 |
| 2013/0231769 A1* | 9/2013 | Tien | ........................ | G06T 7/001 700/121 |
| 2016/0350909 A1* | 12/2016 | Chu | ....................... | G06T 7/0008 |
| 2017/0206468 A1 | 7/2017 | Ghosh et al. | | |

(Continued)

FOREIGN PATENT DOCUMENTS

| | | | | |
|---|---|---|---|---|
| CN | 114264650 A | * | 4/2022 | ............. G06T 7/001 |
| DE | 102004008300 | | 9/2005 | |
| GB | 2515115 | | 12/2014 | |

OTHER PUBLICATIONS

Geary, Best Approach to Adhesion Failure Root-Cause Analysis, BTG Labs blogpost, 2020, pp. 1-9.

*Primary Examiner* — Pinalben Patel
(74) *Attorney, Agent, or Firm* — Burris Law, PLLC

(57) ABSTRACT

A method of automatically detecting adhesive wash-off includes: capturing, by a vision system, before-images of adhesive-covered areas on an assembly bonded by an adhesive before a process; capturing, by the vision system, after-images of the adhesive-covered areas on the assembly after the process; and determining, by a data processing module, an occurrence of the adhesive wash-off based on a comparison between the before-images and the after-images. The method further includes automatically determining a root cause of the adhesive wash-off when a number of occurrences of the adhesive wash-off exceeds a threshold.

20 Claims, 4 Drawing Sheets

(56) References Cited

U.S. PATENT DOCUMENTS

Figure 1:
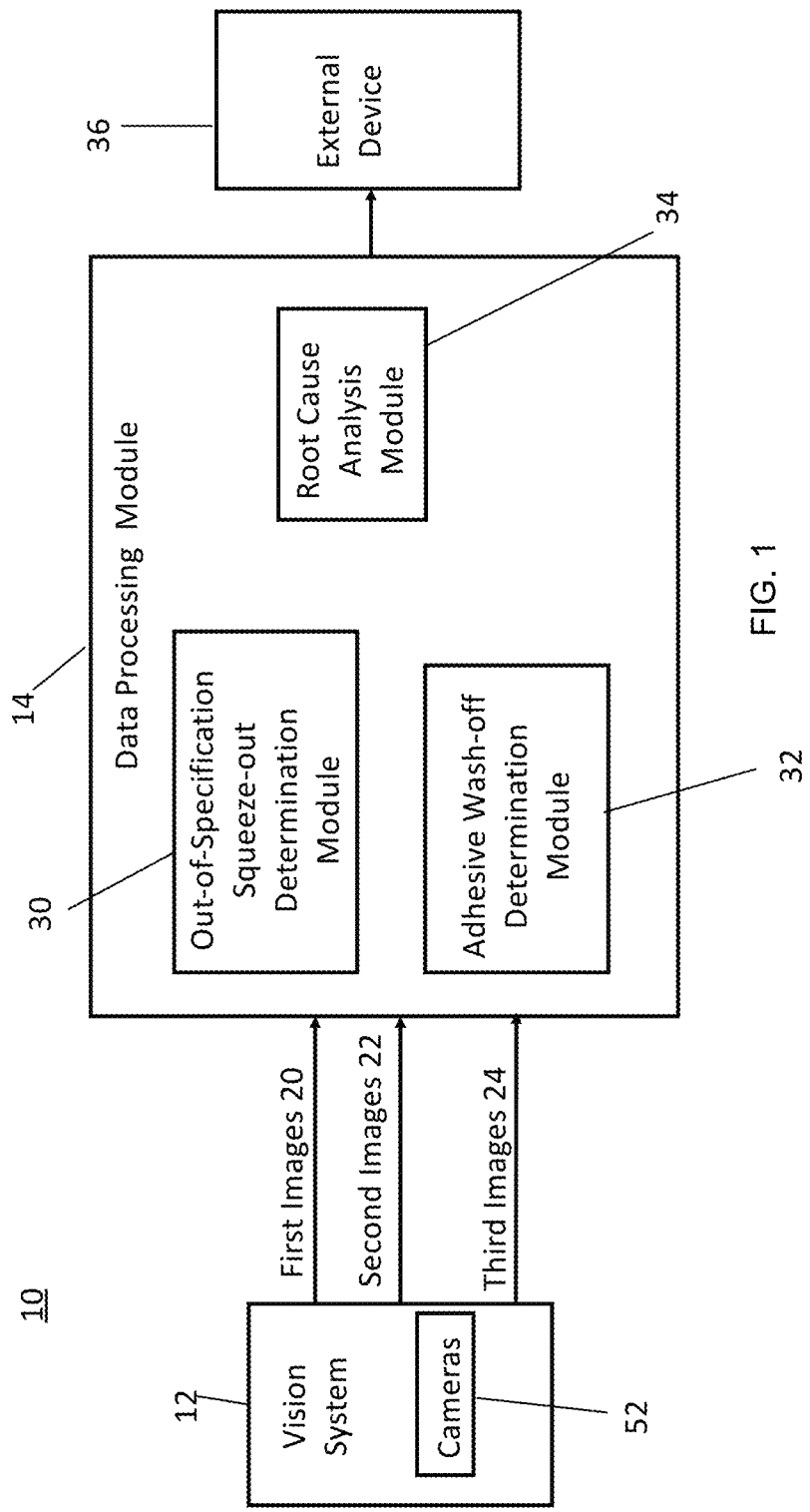

| | | | |
|---|---|---|---|
| 2018/0189940 A1* | 7/2018 | Liu | G06T 7/13 |
| 2019/0300759 A1* | 10/2019 | Prakash | C09J 9/00 |
| 2020/0151861 A1* | 5/2020 | Wynn | C09J 5/00 |

* cited by examiner

METHOD AND APPARATUS FOR AUTOMATED ADHESIVE WASH-OFF QUALITY CONTROL AND ROOT-CAUSE ANALYSIS USING ARTIFICIAL INTELLIGENCE

FIELD

The present disclosure relates to a system and a method for detecting faults in a vehicle manufacturing line.

BACKGROUND

The statements in this section merely provide background information related to the present disclosure and may not constitute prior art.

Adhesives have a wide range of applications within the automotive industry due to their ability to offer improved stiffness, fatigue durability, noise, vibration and harshness (NVH) and sealing. Adhesives are typically dispensed on the Body in White (BIW) sub-assemblies, which then go through a cleaning process, a paint pretreatment process, and an electrocoating (E-coating) process, before entering the baking oven for curing. The adhesive is uncured during the various processes before curing and may be prone to being washed off. Wash off in itself is not considered to be a major problem. The problem lies in what happens to the washed off adhesive beads or blobs. These blobs can easily be redeposited onto highly visible Class-A surfaces where they are cured within the bake oven. Such undesirable defects then have to be manually sanded and repaired leading to increased cost. Alternatively, these washed-off beads are removed from the bath via filtration leading to reduced filter life, compromised performance and increased maintenance costs.

Typically, adhesive wash-off is inspected manually by examining the surfaces of the BIW for any visual adhesives. The manual inspection is time consuming and requires manpower. Typically, to ensure quality, inspection or touching the vehicle is not allowed between stages prior to e-coat bake. As a result, the uncured adhesive beads cannot be removed prior to the e-coat bake oven. Vehicles are inspected after e-coat and prior to paint, but there is only a limited amount of time available to repair these defects due to line configurations.

The above issues and other issues are addressed by the present disclosure.

SUMMARY

In one form, a method of detecting adhesive wash-off is provided, which includes: capturing, by a vision system, before-images of adhesive-covered areas on an assembly bonded by an adhesive before a process; capturing, by the vision system, after-images of the adhesive-covered areas on the assembly after the process; and determining, by a data processing module, an occurrence of the adhesive wash-off based on a comparison between the before-images and the after-images.

In other features, the data processing module is configured to determine the occurrence of the adhesive wash-off based on a change in size of the adhesive-covered areas in the before-images and the after-images, particularly when the change in size of the adhesive-covered areas exceeds a first threshold. The method further includes recording, by the data processing module, the number of occurrences of the adhesive wash-off and determining a root cause of the adhesive wash-off, particularly based on a statistical process control (SPC) chart, when the number of the occurrences of the adhesive wash-off exceeds a second threshold. The root cause is selected from a group consisting of misplacement of an adhesive bead during adhesive dispensing, oversized adhesive beads, adhesive viscosity, spray impingement pressure, water temperature, line speed, and down time. The process is a pretreatment process or an E-coating process. The method further includes: capturing, by the vision system, first images of the adhesive-covered areas before the pretreatment process; capturing, by the vision system, second images of the adhesive-covered areas after the pretreatment process and before the E-coating process; and capturing, by the vision system, third images of the adhesive-covered areas after the E-coating process. The first images are captured after a cleaning process. The method further includes: determining an occurrence of an adhesive squeeze-out based on a comparison between the first image and data stored in the data processing module and quantifying and normalizing, by the data processing module; the adhesive-covered areas to define a threshold number of acceptable adhesive wash-off; automatically sending an alert, by the data processing module, to an external device to report a change in wash-off performance when the threshold number of acceptable adhesive wash-off is exceeded. The alert includes a root cause of the adhesive wash-off. The assembly is a Body in White structure. The method further includes capturing, by the vision system, the before-images and the after-images of a left side, a right side, and a top side of the assembly.

In another form, a method of detecting adhesive wash-off on a Body in White assembly is provided, which includes: capturing, by a vision system, first images of adhesive-covered areas on the BIW assembly after a cleaning process and before a pretreatment process; capturing, by the vision system, second images of the adhesive-covered areas after the pretreatment process and before an E-coating process; capturing, by the vision system, third images of the adhesive-covered areas after the E-coating process; and comparing, by a data processing module, the second images against the first images, and the third images against the first images to determine an occurrence of the adhesive wash-off.

In still another form, a system for automatically detecting adhesive wash-off is provided, which includes a vision system configured to capture the before-images and the after-images of adhesive-covered areas, and a data processing module configured to compare the before-images and the after-images to determine the occurrence of the adhesive wash-off.

Further areas of applicability will become apparent from the description provided herein. It should be understood that the description and specific examples are intended for purposes of illustration only and are not intended to limit the scope of the present disclosure.

DRAWINGS

Figure 2:
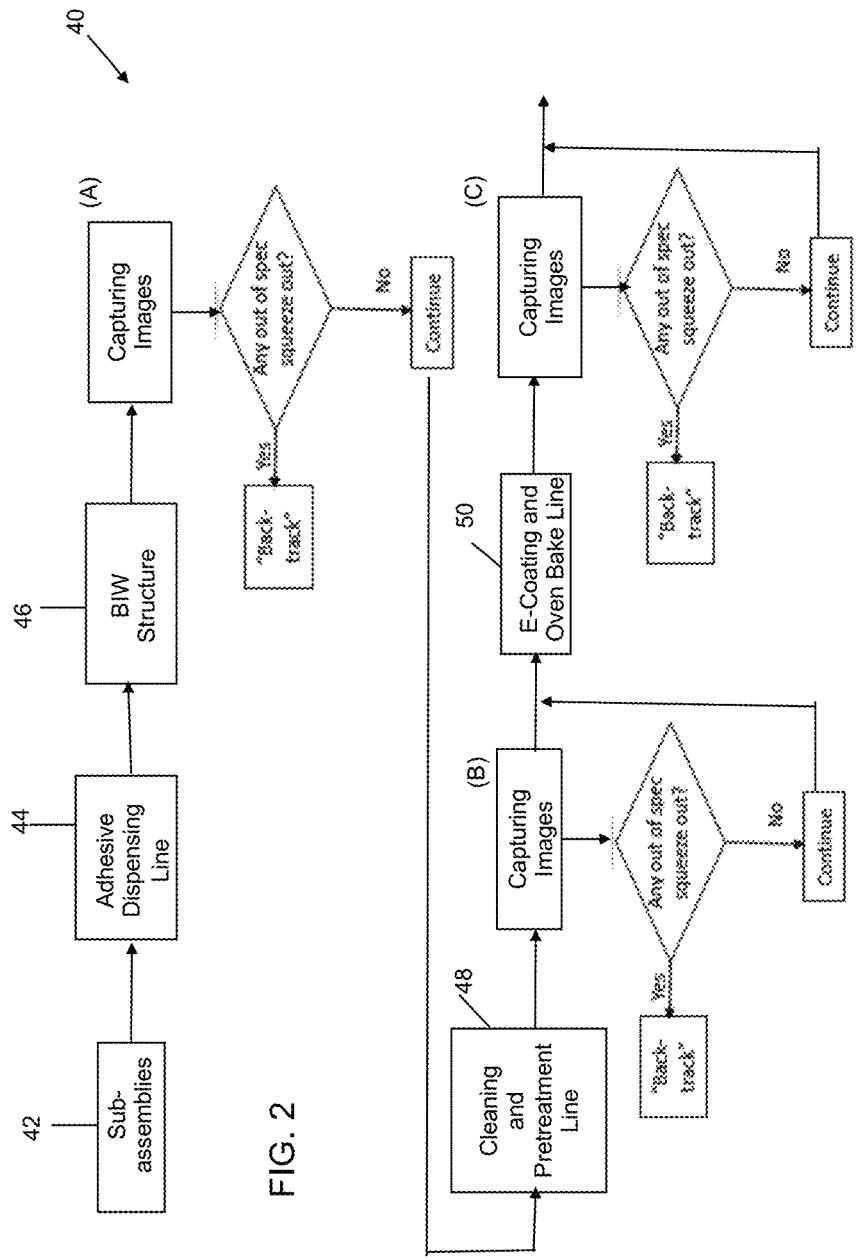

In order that the disclosure may be well understood, there will now be described various forms thereof, given by way of example, reference being made to the accompanying drawings, in which:

FIG. 1 is a schematic diagram of a system for automatically detecting adhesive wash-off in a vehicle manufacturing line constructed in accordance with the teachings of the present disclosure;

FIG. 2 depicts a vehicle manufacturing line that incorporates a method of automatically detecting adhesive wash-off in accordance with the teachings of the present disclosure; and FIGS. 3A to 3D includes images of a plurality of adhesive-covered areas on a rear glass flange of a C-pillar (FIGS. 3A and 3B), a body-side door flange (FIG. 3C), an A-pillar (FIG. 3D) of the vehicle body showing these areas with or without out-of-specification (OOS) squeeze-out.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In this application, including the definitions below, the term "module" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Referring to FIG. 1, a system 10 for automatically detecting adhesive wash off in a vehicle manufacturing line constructed in accordance with the teachings of the present disclosure includes a vision system 12 and a data processing module 14. The vision system 12 captures images of a vehicle body, particularly images of adhesive-covered areas on the vehicle body, at a plurality of locations between different processes along the vehicle manufacturing line. The images include first images 20 captured at a first location, second images 22 captured at a second location, and third images 24 captured at a third location. The first, second, and third images 20, 22, 24 may be taken from one or more of a left side, a right side, a top, underneath of the vehicle body, or may be taken from a particular location of interest. In some cases, the cameras may capture images from underneath the vehicle or along the rockers to gain a more holistic perspective. It is conceivable that adhesive squeeze out from a rocker is likely to be redeposited onto a hood or roof during the e-coat dip stage as the vehicle is dragged into and out of the bath.

The data processing module 14 includes an out-of-specification (OOS) squeeze-out determination module 30, an adhesive wash-off determination module 32, and a root cause analysis module 34. The OOS squeeze-out determination module 30 is configured to detect and determine at the first location an occurrence of OOS adhesive squeeze-out. The adhesive wash-off determination module 32 is configured to detect and determine at the second location and the third location an occurrence of adhesive wash-off. The root cause analysis module 34 is configured to perform a root cause analysis to determine a root cause of the OOS adhesive squeeze-out and a root cause of the adhesive wash-off. The root cause analysis module 34 includes various quality and statistics tools, such as root cause analysis algorithms, to determine the root causes of the OOS adhesive squeeze-out and adhesive wash-off. The data processing module 14 is configured to send an alert to an external device 36, such as a server, when the number of the occurrences of OOS adhesive squeeze-out or the number of the occurrences of adhesive wash-off exceeds a threshold.

Referring to FIG. 2, an exemplary vehicle manufacturing line 40 that incorporates a method of automatically detecting adhesive wash-off in accordance with the teachings of the present disclosure may be a manufacturing line for manufacturing a vehicle body, such as a body in white (BIW) structure 46. The vehicle manufacturing line 40 includes an adhesive dispensing line 44 for dispensing an adhesive on a plurality of components or sub-assemblies 42 to join the sub-assemblies 42 into a vehicle body, such as a BIW structure 46, a cleaning and pretreatment line ("pretreatment line" hereinafter) 48, an electrocoating ("E-coating") and oven bake line ("E-coating line" hereinafter) 50, in this order.

The vision system 12 includes a plurality of cameras 52 located at a first location (A) at the end of the body assembly line right after the BIW structure 46 is completed and prior to the pretreatment line 48, at a second location (B) between the pretreatment line 48 and the E-coating line 50, and at a third location (C) between the E-coating line 50 and a final paint line. At each location, depending on the previous data reported on the potential wash-off areas, several cameras 52 can be implemented to capture images of a plurality of adhesive-covered areas. For example, three cameras 52 may be provided at each location to monitor three sides of the vehicle, e.g. left, top, and right sides. The plurality of cameras 52 capture first images 20 at the first location (A), the second images 22 at the second location (B), and the third images 24 at the third location (C).

In the adhesive dispensing line 44, an adhesive is dispensed on a plurality of components or sub-assemblies 42 for bonding and joining the plurality of sub-assemblies 42 to form the BIW structure 46. After the adhesive dispensing process in the adhesive dispensing line 44, the BIW structure 46 goes through a pretreatment line 48, which includes a spray cleaning process and a pretreatment dip process. In the cleaning process, for example, oil, rust spots, or other contaminants are removed from the BIW structure 46. The pretreatment dip process may involve applying a phosphate or conversion coating that helps obtain a high quality electrocoat finish in the subsequent E-coating process. The E-coating line 50 includes an E-coating process and a baking process in a bake oven. In the E-coating process, the BIW structure 46 is immersed in an electrocoat bath and coatings are applied to the pretreated surfaces of the BIW structure 46. After the E-coat is applied, the coated BIW structure 46 is placed in the bake oven that cures and cross-links the E-coat. After the BIW structure 46 exits the E-coating line 50, paintings including color coat and clearcoat are sequentially applied and cured in their respective ovens to maximize its performance properties.

Referring to FIGS. 3A to 3D, at the adhesive dispensing line 44, the adhesive is dispensed on a plurality of areas of the BIW structure 46 for bonding various components or sub-assemblies 42 of the BIW structure 46, thereby forming a plurality of adhesive-covered areas 60 on the BIW structure 46. When the adhesive is properly applied, no or little adhesive is exposed on the surfaces of the BIW structure 46. However, when the adhesive is not properly applied (for example, due to improper adhesive viscosity, larger bead size or bead misplacement), out-of-specification (OOS) adhesive squeeze-out 62 can be seen on the adhesive-covered areas 60 as circled by dashed lines in FIGS. 3A to 3D. Adhesive squeeze-out refers to the portion of the adhesive that is out of place, particularly on the surfaces of the BIW structure 46. When the size or location of the adhesive squeeze-out is outside the acceptable range, the adhesive squeeze-out is out of specification and is prone to being washed-off in the subsequent cleaning, pretreatment and E-coating processes.

Figure 3B:
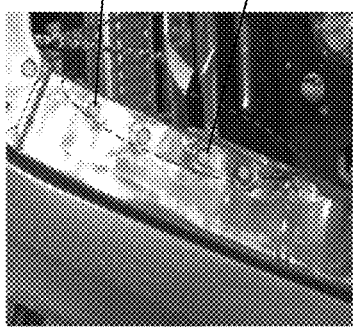
Figure 3C:
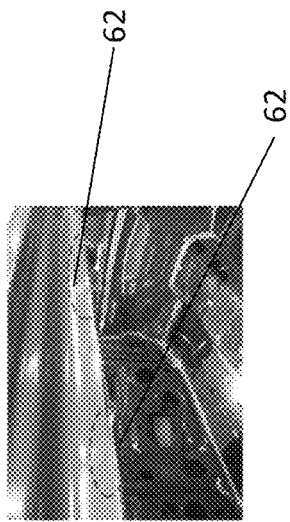
Figure 3A:
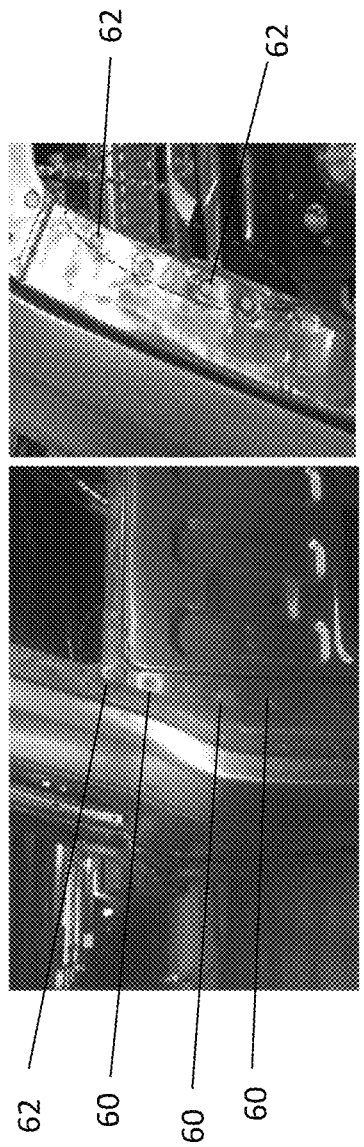
Figure 3D:
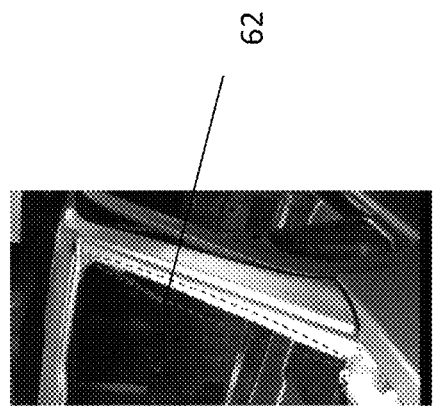

FIG. 3A shows a plurality of adhesive-covered areas on the rear glass flange between a C-pillar and a back panel (back wall of the cab behind the seat) without OOS adhesive squeeze out and with an OOS squeeze-out circled by dashed lines and indicated by reference number 62. FIG. 3B shows a plurality of OOS squeeze-out 62 on the rear glass flange. FIG. 3C shows the adhesive-covered areas on a bodyside door flange with OOS squeeze-out 62. FIG. 3D shows the adhesive-covered areas along the A pillar with OOS squeeze out 62.

Referring back to FIG. 2, after the BIW structure 46 is completed and exits the final assembly stage, the plurality of cameras 52 take first images 20 of the adhesive-covered areas 52 at the first location (A) and send the first images 30 to the data processing module 14 for analysis. The first images 30 taken at the first location (A) right after the vehicle body is fully assembled provide baseline images of a fully assembled vehicle body, which can be used against a known standard. The OOS squeeze-out determination module 30 is configured to detect any out-of-specification (OOS) adhesive squeeze-out on the BIW structure 46 based on a comparison between the first images 20 and pre-stored data regarding an acceptable range of adhesive squeeze-out at the first location (A).

When the size of the adhesive-covered areas in the first images 29 are out of the acceptable range, the OOS squeeze-out determination module 30 determines the occurrence of the OOS adhesive squeeze-out and records the occurrence of the OOS adhesive squeeze-out. The OOS squeeze-out determination module 30 may also send an alert to an external device 36 advising an operator to take action at this point, for example, to perform solvent-wiping excess adhesive squeeze-out. For example, the OOS squeeze-out determination module 30 may identify the location of the OOS squeeze-out on the first images 20 by using a laser pointer for cleaning/removing the adhesive squeeze-out. This can be done before the BIW structure 46 enters the pretreatment line 48 when the adhesive is not cured yet to reduce manpower needed for cleaning after E-coat oven which is significantly more difficult to clean/remove the cured adhesive. Also, once the BIW structure 46 passes this point, the BIW structure 46 cannot be inspected or touched until after the E-coat baking process in the E-coating line 50. Nothing can be done to correct any defects beyond this point.

When the number of the occurrences of the OOS adhesive squeeze-out exceeds a threshold, the root cause analysis module 34 is activated to perform a root cause analysis to determine a root cause of the OOS adhesive squeeze-out.

The OOS squeeze-out determination module 30 is also configured to quantify and normalize the adhesive-covered areas to define a threshold number for acceptable adhesive squeeze-out. The OOS squeeze-out determination module 30 may include a detection algorithm that can associate OOS squeeze-out number to the corresponding part ID, vehicle VIN number, and skid number in order to make the root-cause analysis process simpler.

After the BIW structure 46 is cleaned and examined for possible OOS squeeze-out, the BIW structure 46 is sent to the pretreatment line 48. The adhesive-covered areas on the BIW structure 46 are prone to being washed off in the pretreatment line 48 due to, for example, high spray impingement pressure, increased pressure of deluge directed onto location of adhesive joint, increased temperature of water rinses and alkaline cleaners, increased static pressures encountered from immersion stages, and increased exposure time due to decrease in line speed. Therefore, the cameras 52 capture second images 22 of the adhesive-covered areas of the BIW structure 46 at the second location (B) after the BIW structure 46 exits the pretreatment line 48 and before entering the E-coating line 50 to identify any possible adhesive wash-off in the pretreatment line 48. The adhesive wash-off determination module 32 compares the second images 22 against the first images 20 (for the corresponding sides) and determine whether adhesive wash-off has occurred based on the comparison between the first and second images 20, 22. The second images taken at location (B) show what adhesive has been removed during the pretreatment line 48 where high-pressure impingement nozzles and high temperature fluids are used to clean and prepare the surfaces for the E-coat dip. The adhesive wash-off determination module 32 compares the second images 22 against the first images 20 and determines where the adhesive has been removed and needs to be addressed upstream to prevent reoccurrence. The adhesive wash-off determination module 32 may implement a machine learning approach, training data set, and neural network framework to improve detection efficiency and performance. Training data set can be obtained from the previous images taken from the areas of interest and/or could be added in-line.

For example, the adhesive wash-off determination module 32 may compare at least one of the size, position, and displacement of the adhesive-covered area in the first and second images 20, 22 depending where the adhesive-covered areas are on the components/sub-assemblies. For example, some adhesive-covered areas (such as a localized glob that has run down a flange) may have a relatively small area but pose a high risk of contamination, whereas another adhesive-covered areas may have a small uniform amount of squeeze-out along an edge of a joint which has a large cumulative area but pose little risk of contamination. When the change in size, position or displacement of the adhesive-covered area exceeds a first threshold, the adhesive wash-off determination module 32 determines the occurrence and severity of the adhesive wash-off. Depending on the locations of the adhesive-covered areas, the adhesive wash-off determination module 32 may use different criteria for different adhesive-covered areas for determining the occurrence/severity of the adhesive wash-off. When a number of the occurrences of the adhesive wash-off exceeds a second threshold, the root cause analysis module 34 is activated to analyze the root cause of the adhesive wash-off.

Thereafter, the BIW structure 46 is sent to the E-coating line 50. In the E-coating line 50, the BIW structure 46 is prone to being washed off due to, for example, high dipping temperature and processes. Therefore, the cameras 52 take third images 24 after the BIW structure 46 exits the E-coating line 50. The adhesive wash-off determination module 32 compares the third images 24 against the first images 20 for the corresponding sides to determine whether adhesive wash-off has occurred in the E-coating line 50. The third images 24 are taken after E-coat dip and bake to show if any adhesive is removed (compared to the second images and the first images) and also if any adhesive has been redeposited onto surface panels. This redeposit could come from the vehicle being processed or from previous vehicles and is floating around in the E-coat dip bath. The third images 24 are the final quality indicator and can show whether the wash-off problem has been solved as the system 10 of the present disclosure works backwards to improve the process.

Similarly, the adhesive wash-off determination module 32 may compare the size, location, or displacement (i.e. movement) of the adhesive-covered area in the first and third images 20, 24. When the change in size, location, or displacement of the adhesive-covered area exceeds a threshold, the adhesive wash-off determination module 32 may determine that adhesive wash-off has occurred or has increased the risk of wash-off in the E-coating line 50. When a number of the occurrence of the wash-off exceeds a threshold, the root cause analysis module 34 is triggered to perform a root cause analysis for the adhesive wash-off in the E-coating line 50. Similarly, the adhesive wash-off determination module 32 may be configured to quantify and normalize the adhesive-covered areas to define threshold values for the maximum allowed adhesive wash-off at the second location (B) and the third location (C), respectively.

The ultimate goal would be zero wash-off. The compilation of the first, second and third images 20, 22, 24 allows the system 10 of the present disclosure to track where the problem occurs along with quantifying the improvement. Using the system 10 of the present disclosure would "drill down" into the cause and take action to remedy the problem, as opposed to prior art devices or methods where an operator is aware of the results at the end of e-coat bake but has little understanding as to how or when these problems occur. Using a prior art device or method, an operator can only see adhesive related issues at the end of the E-coat line and then go crawling over the body to point out where they see adhesive and believe that this is the root cause. Lab testing as shown that a squeezed out adhesive bead from a joint which is fully supported is unlikely to be washed off even under direct impingement from spray heads. Squeezed out adhesive that is unsupported, dripping or dangling will easily be removed, increasing the risk of redepositing. As more mixed metals (i.e. an aluminum casting within a steel body) are used, galvanic isolation between the metals are needed to reduce the corrosion risk. One way of achieving this is to deliberately over-fill the joints with adhesive so that it squeezes out to form a seal. This brings up the need for controlled squeeze-out in a supported manner rather than unsupported beads leading to increased wash-off.

The root-cause analysis module 34 includes a machine learning module to analyze the factors related to the OOS squeeze-out, or adhesive wash-off when the number of the occurrences of OOS squeeze-out or the adhesive wash-off exceeds a threshold. The root-cause analysis module 34 may "back-track" and determine the root-cause of OOS adhesive squeeze out through artificial intelligence (AI) and machine learning (ML) algorithms by analyzing the factors related to the OOS adhesive squeeze-out or the adhesive wash-off.

The root-cause analysis module 34 analyzes the time series data for the critical factors/parameters affecting adhesive dispensing quality and adhesive wash-off performance and determines if there is any deviation from statistical process control (SPC) charts. SPC is a method of controlling quality of products being produced by employing statistical methods to monitor and control a process. Each of the adhesive dispensing line 44, the pretreatment line 48, and the E-coating line 50 may have its own SPC chart for controlling its process.

For example, the SPC chart for the adhesive dispensing line 44 may include statistical data regarding the adhesive dispensing data/parameters, such as a refill time and/or shot meter back pressure. The SPC chart for the pretreatment process may include statistical data regarding the pretreatment process data/parameters, such as the spraying pressure, water temperature, etc. The SPC chart for the E-coating process may include statistical data regarding the E-coating data/parameters, such as dipping temperature and dipping pressure, among others.

When the operating parameters for the adhesive dispensing process, the cleaning and pretreatment processes, or the E-coating and oven bake processes deviate from their respective the statistical data as shown on the SPC charts, the root-cause analysis module 34 can determine the root cause of the 00S squeeze out or the adhesive wash-off based on such deviation.

The factors relating to 00S squeeze out may include, but not be limited to, improper adhesive viscosity, improper bead size, and bead misplacement. The adhesive viscosity can be obtained from the quality control data provided by adhesive suppliers. In addition, dispensing data such as refill time and/or shot meter back pressure can be correlated to the adhesive viscosity for each dispensed shot. The misplacement of adhesive bead can be detected by comparing the amount of adhesive squeeze out at the first location with that of previous vehicles, if no significant viscosity change was reported for the adhesive dispensed on the same part ID.

By identifying OOS adhesive squeeze-out at the first location (A) before the cleaning and pretreatment processes, the locations of possible adhesive wash-off in the subsequent E-coating process can be detected and the possible wash-off problem can be solved as early as possible.

Several factors play a role in adhesive wash-off, including misplacement of an adhesive bead during dispensing, over-sized adhesive bead, adhesive viscosity, spray impingement pressure and water temperature within the cleaning stages, line speed, and down time. By identifying the adhesive wash-off at the second location (B) after the cleaning and pretreatment processes and before the E-coating and oven bake processes and the third location (C) after the E-coating and oven bake processes, the adhesive wash off problems can be detected and resolved.

All the processes will be performed automatically, and the data processing module 14 can send an alert to the external device 36, such as the server, to report any change in wash-off performance. The root-cause analysis module 34 may check the various parameters in the adhesive dispensing line 44 against the SPC chart to determine whether any of the operating parameters is outside the upper limits and the lower limits based on the SPC chart, thereby determining the root cause of the 00S squeeze out. Similarly, the root-cause analysis module 34 may check the various parameters in the pretreatment line 48 and the E-coating line 50 against their respective SPC to determine whether any of the operating parameters is outside the upper limits and the lower limits based on their respective SPC chart, thereby determining the root cause of the adhesive wash-off in the pretreatment line 48 and the E-coating line 50, respectively.

In summary, the system and method of the present disclosure can automatically monitor and detect the surfaces of the BIW structure to identify any OOS adhesive squeeze-out right after the BIW structure is assembled and before the cleaning and pretreatment line, and any adhesive wash-off in the cleaning and pretreatment line and the E-coating and oven bake line. The data processing module 14 is configured to receive first, second and third images 20, 22, 24 from the vision system 12 at different locations along the vehicle manufacturing line and automatically identify the occurrence of OOS adhesive squeeze-out and adhesive wash-off, its location and displacement based on the first, second and third images 20, 22, 24. The data processing module 14 may be integrated in a computing device, such as a laptop computer, a desktop computer, a server, a network computer, a personal digital assistant (PDA), a smart phone, and a tablet.

The system and method have the advantages of performing automatic wash-off detection and root-cause analysis without human interaction, thereby saving manhours and avoiding prolonged manual root-cause analysis. The detection of OOS adhesive squeeze out, the detection of adhesive wash-off, and the root cause analysis are performed automatically through an advanced detection algorithm that can associate wash-off performance number to the corresponding part ID, vehicle VIN number, and skid number in order to make the detection and the root-cause analysis process simpler.

Moreover, the system and the method can save manufacturing and maintenance costs due to early detection of the adhesive wash-off. Due to early detection and root-cause analysis, the occurrence of adhesive wash-off in the bath can be reduced and significant amount of adhesive deposition in the bath and on the filter can be avoided, while reducing coating quality issues through early detection and root-cause analysis. No significant investment (e.g. minimum three cameras and a data processing module) is required compared to the cumulative savings due to reduced maintenance and quality issues.

While the system and method of the present disclosure has been described in connection with a vehicle manufacturing line including a cleaning and pretreatment line and an E-coating and oven bake line, it is understood that the system and method for detecting adhesive wash-off can be implemented in any coating lines in any manufacturing plant to improve visual appearance and corrosion performance.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of detecting adhesive wash-off, comprising:
    capturing, by a vision system, before-images of adhesive-covered areas on an assembly bonded by an adhesive at a first location upstream from and before a process in a manufacturing line;
    capturing, by the vision system, after-images of the adhesive-covered areas on the assembly at a second location downstream from and after the process in the manufacturing line; and
    determining, by a data processing module, an occurrence of the adhesive wash-off based on a comparison between the before-images and the after-images, the comparison being performed by the data processing module.

2. The method according to claim 1, wherein the after-images are captured right after the assembly exits the process in the manufacturing line.

3. The method according to claim 1, wherein the data processing module determines the occurrence of the adhesive wash-off when a change in at least one of size, location, and displacement of adhesive-covered areas in the before-images and the after-images exceeds a first threshold.

4. The method according to claim 1, further comprising recording, by the data processing module, the number of occurrences of the adhesive wash-off.

5. The method according to claim 4, further comprising determining a root cause of the adhesive wash-off when the number of the occurrences of the adhesive wash-off exceeds a second threshold.

6. The method according to claim 5, further comprising determining the root cause of the adhesive wash-off based on a statistical process control (SPC) chart.

7. The method according to claim 5, wherein the root cause is selected from a group consisting of misplacement of an adhesive bead during dispensing, oversized adhesive bead, adhesive viscosity, spray impingement pressure, water temperature, line speed, and down time.

8. The method according to claim 1, wherein, during the process in the manufacturing line, the adhesive on the assembly is uncured and a liquid is applied on the assembly.

9. The method according to claim 1, wherein the process is a pretreatment process or an E-coating process, the method further comprising:
    capturing, by the vision system, first images of the adhesive-covered areas before the pretreatment process;
    capturing, by the vision system, second images of the adhesive-covered areas after the pretreatment process and before the E-coating process; and
    capturing, by the vision system, third images of the adhesive-covered areas after the E-coating process.

10. The method according to claim 9, wherein the first images are captured after the assembly is assembled and before a cleaning process.

11. The method according to claim 10, further comprising determining an occurrence of an adhesive squeeze-out based on a comparison between the first image and data stored in the data processing module.

12. The method according to claim 1, further comprising quantifying and normalizing, by the data processing module, the adhesive-covered areas to define a threshold number of acceptable adhesive wash-off.

13. The method according to claim 12, further comprising automatically sending an alert, by the data processing module, to an external device to report a change in wash-off performance when the threshold number of acceptable adhesive wash-off is exceeded and/or a threshold for a change in area, location or displacement is exceeded.

14. The method according to claim 13, wherein the alert includes a root cause of the adhesive wash-off.

15. The method according to claim 1, wherein the before-images are taken after the assembly is assembled and before a cleaning and pretreatment process, the method further comprising comparing the before-images against pre-stored data to determine an out-of-specification adhesive squeeze-out, marking on the before-images a location of the out-of-specification squeeze-out, and sending an alert to an external device.

16. The method according to claim 1, further comprising capturing, by the vision system, the before-images and the after-images of at least one of a left side, a right side, a top side, an underside, and a predetermined area of the assembly.

17. A system for automatically detecting adhesive wash-off according to the method of claim 1, comprising:
- a vision system configured to capture the before-images and the after-images of adhesive-covered areas; and
- a data processing module configured to compare the before-images and the after-images to determine the occurrence of the adhesive wash-off.

18. The system according to claim 17, wherein the data processing module includes a machine learning module configured to track down a root cause of the adhesive wash-off.

19. The system according to claim 17, wherein the machine learning module is configured to quantify and normalize the adhesive-covered areas to determine a threshold number for acceptable adhesive wash-off.

20. A method of detecting adhesive wash-off on a Body in White assembly, comprising:
- capturing, by a vision system, first images of adhesive-covered areas on the BIW assembly after the BIW assembly is assembled and before a cleaning and pretreatment process;
- capturing, by the vision system, second images of the adhesive-covered areas after the cleaning and pretreatment process and before an E-coating process;
- capturing, by the vision system, third images of the adhesive-covered areas after the E-coating process; and
- comparing, by a data processing module, the second images against the first images, and the third images against the first images to determine an occurrence of the adhesive wash-off,
- wherein an adhesive on the BIW assembly is uncured during the cleaning and pretreatment process.

* * * * *